Figure 1:
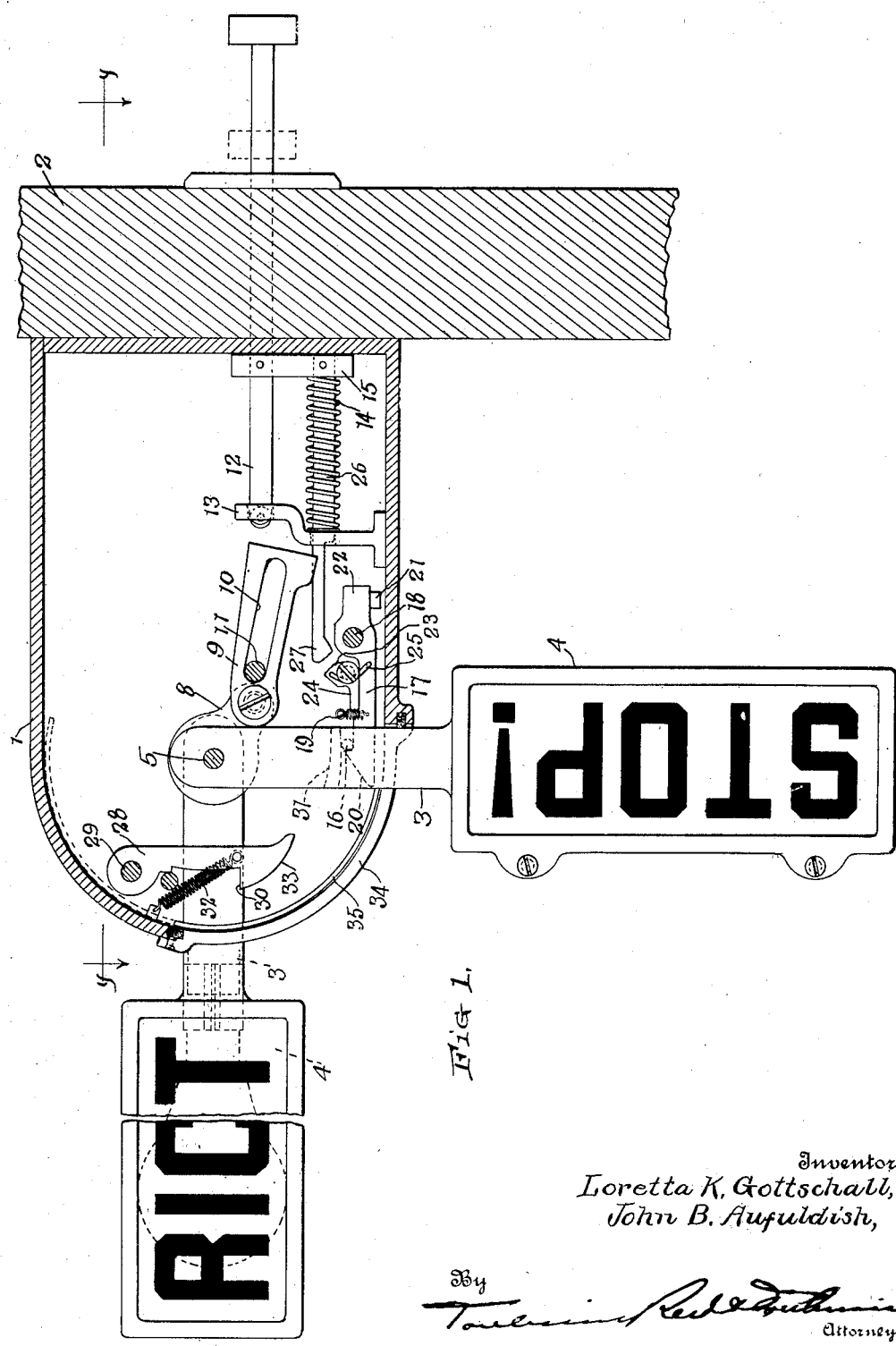

L. K. GOTTSCHALL & J. B. AUFULDISH.
SIGNALING DEVICE FOR AUTOMOBILES.
APPLICATION FILED JULY 12, 1915.

1,182,269.

Patented May 9, 1916.
4 SHEETS—SHEET 1.

Inventors
Loretta K. Gottschall,
John B. Aufuldish,

By

Attorneys

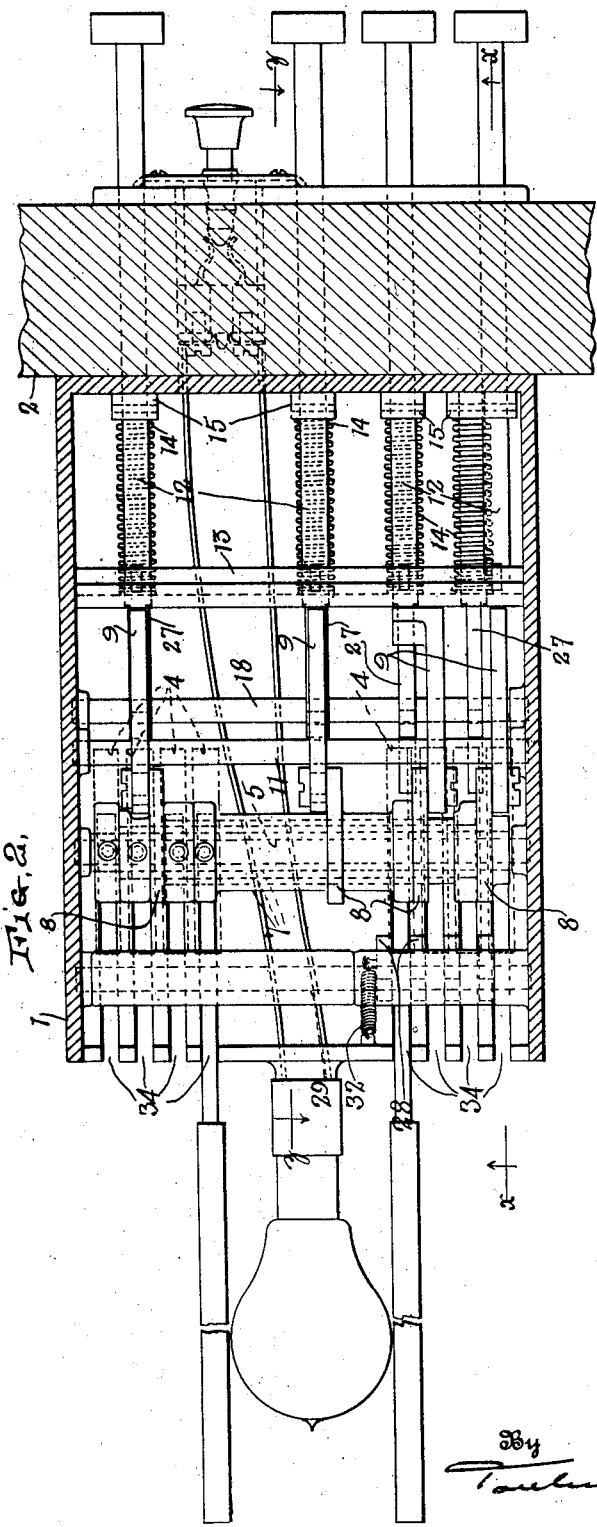

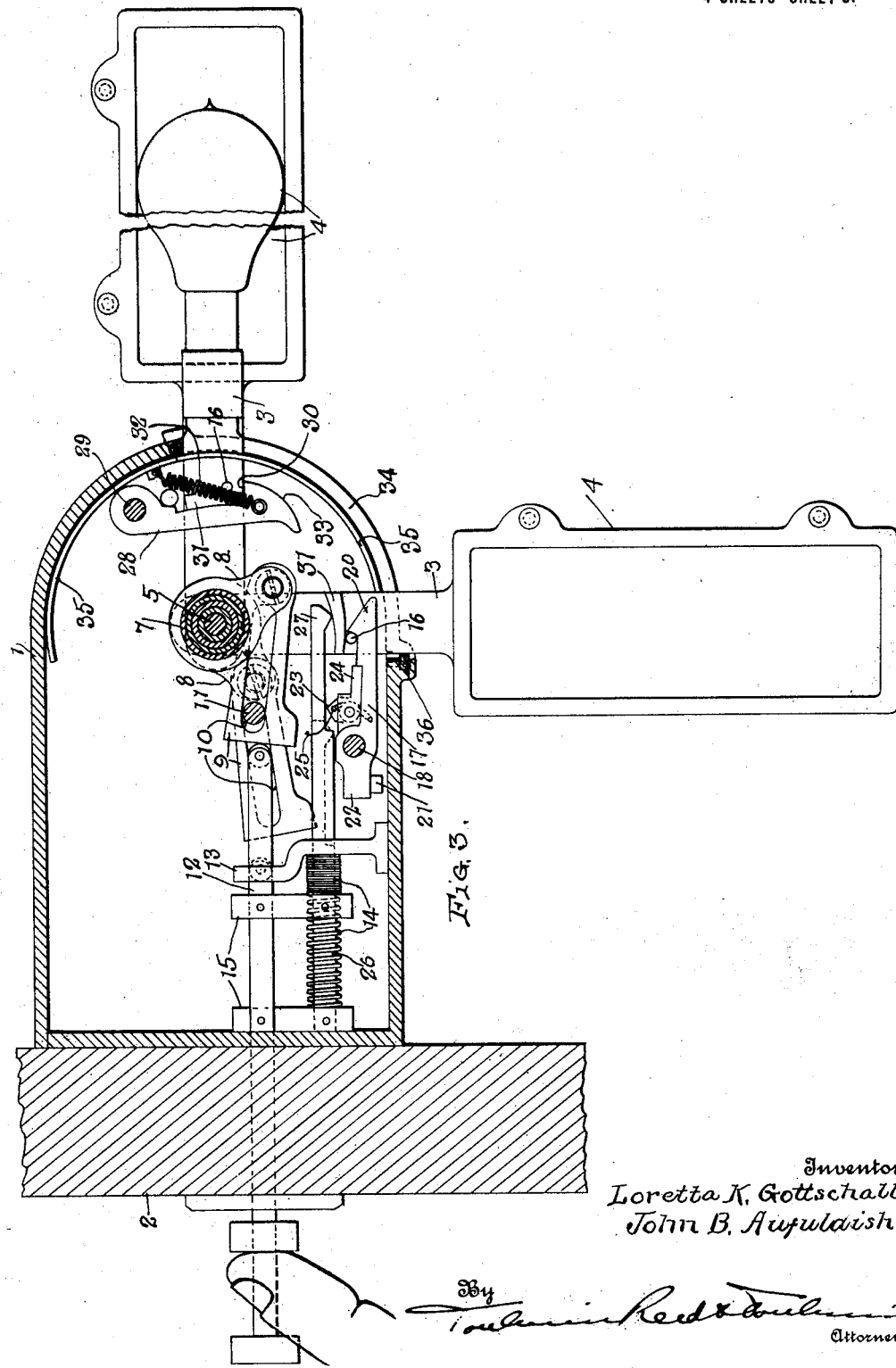

L. K. GOTTSCHALL & J. B. AUFULDISH.
SIGNALING DEVICE FOR AUTOMOBILES.
APPLICATION FILED JULY 12, 1915.
1,182,269.
Patented May 9, 1916.
4 SHEETS—SHEET 4.
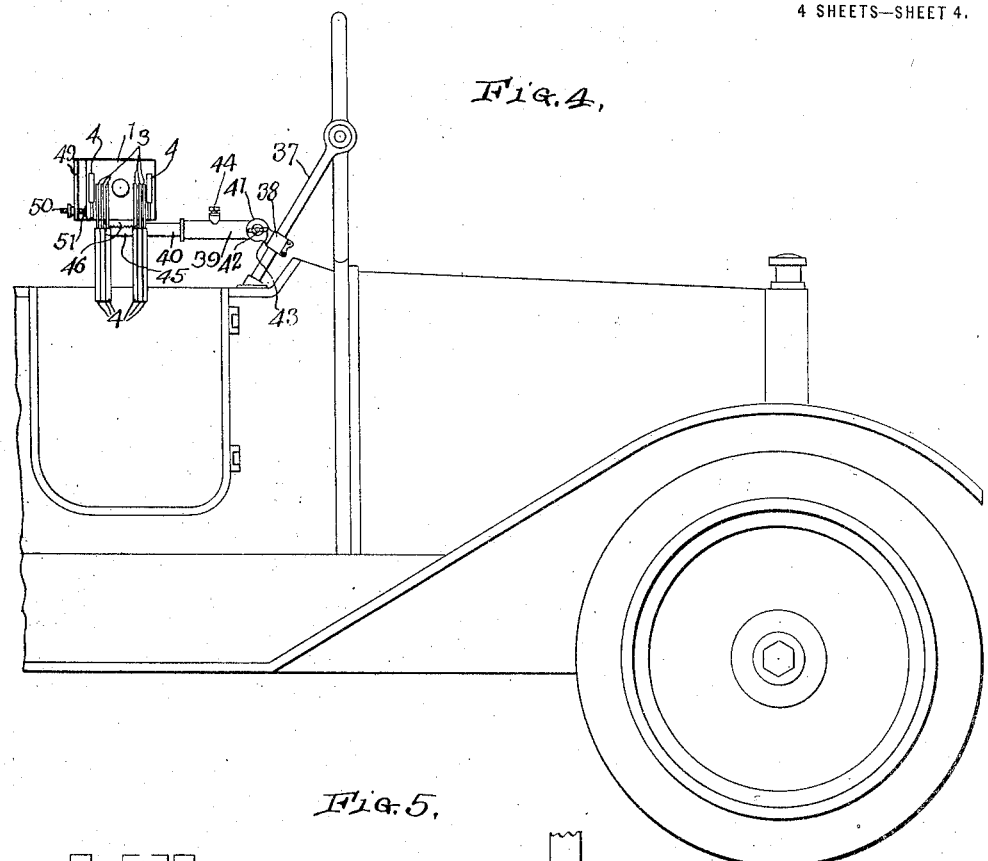
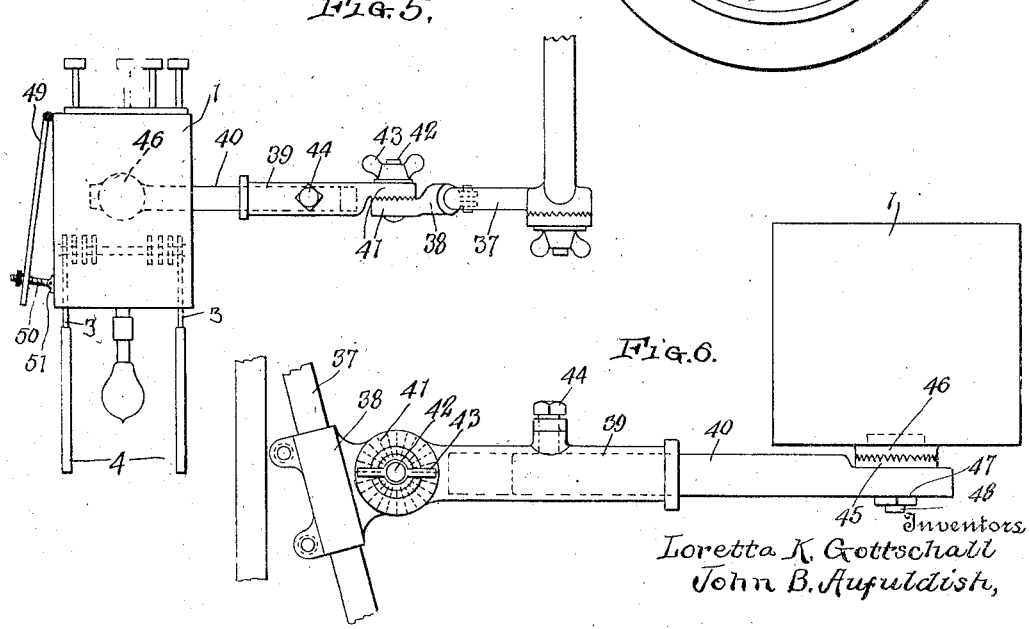
Inventors
Loretta K. Gottschall
John B. Aufuldish,
By
Attorneys

UNITED STATES PATENT OFFICE.

LORETTA K. GOTTSCHALL AND JOHN B. AUFULDISH, OF DAYTON, OHIO; SAID AUFULDISH ASSIGNOR TO SAID GOTTSCHALL.

SIGNALING DEVICE FOR AUTOMOBILES.

1,182,269.  Specification of Letters Patent.  Patented May 9, 1916.

Application filed July 12, 1915. Serial No. 39,237.

*To all whom it may concern:*

Be it known that we, LORETTA K. GOTTSCHALL and JOHN B. AUFULDISH, citizens of the United States, residing at Dayton, in the county of Montgomery and State of Ohio, have invented certain new and useful Improvements in Signaling Devices for Automobiles, of which the following is a specification, reference being had therein to the accompanying drawing.

This invention relates to signaling devices for automobiles and similar vehicles and is in the nature of an improvement upon the device shown and described in the application for patent filed by us December 12th, 1914, Ser. No. 876,918.

The object of the present invention is to facilitate the manipulation of the signals and to provide means for positively controlling their movements.

To this end it is a further object to provide separate means for actuating each of the signals; to provide means for locking the signals in inoperative positions; to provide the actuating devices with means for releasing the locking devices; to provide improved means for retaining the signals in their signaling or operative positions and for releasing the same when another signal is operated.

It is also an object of the invention to simplify the construction and operation of the mechanism and thus reduce the cost of manufacture and also render the device less liable to get out of order; and to provide means for preventing the entrance of dust or dirt into the casing in which the mechanism is mounted.

In the accompanying drawings, Figure 1 is a vertical, sectional view, taken on the line *x x* of Fig. 2, looking in the direction of the arrows and showing the operating and controlling devices in elevation; Fig. 2 is a horizontal, sectional view taken on the line *y y* of Fig. 1 and looking in the direction of the arrows; Fig. 3 is a sectional view taken on the line *z z* of Fig. 2 and looking in the direction of the arrows; Fig. 4 is an elevation of a portion of an automobile showing an adjustable bracket for securing the signaling device thereto; Fig. 5 is a plan view of such a bracket; and Fig. 6 is a side elevation of the same.

In these drawings we have illustrated one embodiment of our invention and have shown the device as designed for application to the side wall of a closed car with the actuating devices extending into the car and directly operable by the driver. Obviously, the device could, if desired, be mounted in other positions and the actuating devices accommodated to these positions without departing from the present invention. As here shown the mechanism as a whole is mounted upon a frame which is in the form of a casing 1 rigidly secured to a supporting structure 2 which, as stated, may be the side wall of a closed car or any other suitable part of a car.

The signals may be of various forms but I prefer to provide them as shown in the drawings where each signal comprises two arms 3, each arm having at its outer end an enlarged portion or indicator plate 4 which carries the indication or signal proper, which may be a word, such as "Right" or "Stop", or may be of colored glass to correspond to the usual colored running lights. Each arm 3 is pivotally mounted on a shaft 5 which is journaled in the main frame or casing 1. The two parts or arms of each signal are spaced apart so that when in their signaling position they will be on opposite sides of an electric lamp, such as is shown at 6, and the indication upon the one part is arranged to be read from a position in front of the vehicle and the indication on the other part is arranged to be read from a position in the rear of the vehicle. Preferably, the several signals are mounted on a single axis so that when in their inoperative positions they will be arranged in alinement and will occupy comparatively little space. To this end they are nested and connected by means of telescoping sleeves 7 substantially as shown and described in the above mentioned application.

While we prefer to use this double signal it will be obvious that a signal comprising a single arm, or the like, could be used in connection with many features of the invention and it will be understood that the term "signal," as used in the specification and claims is not intended to be limited to the double signal, except where the latter is specifically described.

The operating mechanism for the signals is similar to that shown in the above mentioned application and each pair of arms has connected therewith, either directly to one of the arms or to the connecting sleeve, a crank arm 8 to which is pivotally connected a rearwardly extending slide bar 9 having a longitudinal slot 10 to receive a pin or shaft 11 which serves to support and guide the slide bar or operating member, 9. The crank arm 8 extends downwardly from its axis so that a thrust on the slide bar will carry the arms 3 about their axes and elevate the signal.

The actuating mechanism for imparting movement to the slide bars, or operating members, may be of any suitable kind which can be readily manipulated by the driver. In the present instance we have utilized a separate thrust rod 12 for each slide bar and have mounted these thrust rods so that they extend through the rear wall of the frame or casing 1 and through the supporting wall on which the casing is mounted. The inner ends of the several rods are guided in an apertured guide plate 13 secured to the bottom of the casing 1 and extending upwardly therefrom. Each thrust bar is held normally in its outer or inoperative position by means of a spring 14 which is confined between the guide plate 13 and a depending arm or lug 15 rigidly secured to the rod. The inner ends of the several thrust rods are arranged in operative relation to and in the present instance in alinement with the respective slide bars so that a thrust on the rod will impart longitudinal movement to the slide bar and cause the operation of the selected signal. As here shown, the thrust rods are disconnected from the slide bars for two purposes, first to permit the slide bar to rock about the shaft 11 as the crank arm 8 swings about its center and second to enable the releasing device, which will be hereinafter described, to be operated before movement is imparted to the slide bar. It will be noted that when the slide bars are in their inoperative positions, as shown in Fig. 1, the rear ends thereof are inclined upwardly and rearwardly. This permits of the upward movement of the end of the slide bar which is in engagement with the end of the thrust rod with a minimum amount of friction.

The signals are preferably locked in their lowermost positions to prevent them being accidentally moved into their operative positions and to prevent the jar or vibration of the vehicle causing them to rattle. To this end, one arm of each signal is provided, preferably within the casing 1, with a stop 16 adapted to be engaged by a pawl 17 mounted on a shaft 18 and held normally in its operative position by means of a spring 19. The forward end of the nose is beveled on its upper edge, as shown at 20, and a stop 21 arranged in the path of a tail 22 which extends beyond the axis of the pawl and serves to limit the upward movement of the pawl when the signal arm has been moved away from the same and to retain the beveled nose 20 in a position to be engaged by the stop 16 as the signal returns to its normal position, thus causing the signal to depress the pawl and to be automatically locked in its lower position.

In order that each signal may be free to move when the operating mechanism therefor is actuated we have provided each thrust rod with means for releasing the locking pawl for its signal. To this end each pawl is provided with a yieldable dog 23, which, as here shown, extends upward from the pawl in front of its axis, is pivotally mounted thereon and has a forwardly extending portion 24 which bears upon the upper edge of the pawl and forms a firm connection between the pawl and the pivoted dog 23. A spring 25 holds the dog normally in its operative position but permits the same to yield rearwardly, as will hereinafter appear. Connected with each thrust rod is a secondary rod 26 which, in the present arrangement, is secured at one end to the lug or arm 15 carried by the thrust rod, is guided in an opening formed in the guide plate 13 and is provided at its forward end with a beveled nose 27 arranged to engage the upper end of the dog 23 when the thrust rod is actuated. The distance between the nose 27 on the rod 26 and the dog 23 is less than the distance between the end of the thrust rod 12 and the slide bar 9. Consequently, when the thrust rod is actuated the locking pawl 17 may be moved into its inoperative position before any movement is imparted to the slide bar or its signal.

Where the signals are arranged normally in their lowermost positions and are moved into an upper or horizontal position for signaling purposes it is obvious that some means should be provided for retaining them in their operative positions and it is also necessary that some means should be provided for releasing the signal which is in operative position when another signal is moved into its operative position. In the present instance we have provided a series of detents or locking pawls 28, one for each signal, and have arranged these pawls on a shaft 29 mounted in the main frame or casing 1. Each pawl is provided at its lower end with a nose or shoulder 30 adapted to engage beneath a stop 31 rigidly secured to one side of one arm of the corresponding signal. A spring 32 acts upon the pawl 28 to hold the same in its operative position and the lower end of the pawl, beyond the shoulder 30, is curved, as shown at 33, to enable it to be engaged by the stop and the pawl moved rearwardly to permit the signal to pass to its operative position. Preferably, the pawls 28 for the several signals, are rigidly connected one to the other as by mounting them all on a common sleeve, so that the operation of one pawl will cause the operation of all the pawls. Consequently, when one signal is in its operative position the movement of any other signal into its operative position will cause the elevated signal to be released. Preferably, the stop 31 is in the form of a curved or cam shaped rib extending transversely to the arm of the signal and having its upper portion arranged to engage the curved or cam shaped lower portion of its pawl and move the several pawls into their inoperative positions and to hold said pawls in their inoperative positions while the signal which is being operated moves into its operative position. When the signal reaches its operative position the pawl moves into engagement with the lower end of the stop 31 and retains the signal in such position. This elongated stop has the advantage of releasing the signal in signaling position at the very beginning of the movement of any other signal.

Preferably the forward portion of the casing 1 is curved, as shown, and that portion arranged above the horizontal position of the arms is solid so as to exclude dust and other foreign matter, but the portion arranged below the horizontal positions of the signals is necessarily slotted, as shown at 34, to permit of the travel of the signals. In order that these slots may be closed when the signals are in their inoperative positions we have secured to each arm 3 of the several signals a guard plate 35 which extends upwardly therefrom and is of a width and length sufficient to close the slot in which the particular arm travels when that arm is in its lowermost position and is arranged to be moved into the upper part of the casing 1 when the arm is in its operative or elevated position. The arms drop by gravity and while they will be of a light construction and the jar incident to their coming into contact with the lower part of the frame will not be great, it is usually preferable to provide a buffer or cushioning device, such as a strip of leather 36, secured to the lower part of the casing and extending into the paths of the several arms.

Instead of mounting the device upon the wall of a closed car it can, of course, be attached in various ways to various parts of the vehicle. In Figs. 4, 5 and 6 we have shown one manner in which the device may be attached to an automobile of the touring car or roadster type. To accomplish this we preferably provide an adjustable bracket which can be secured to a convenient part of the vehicle and, as shown in the figures mentioned, is secured to the brace rod for the wind shield, which is shown at 37. While the bracket may be of any one of various kinds and may be capable of various adjustments that here shown is very convenient and inexpensive and produces a very firm support for the device. It comprises a clamp 38 adapted to extend about the brace rod 37 of the wind shield and having adjustably secured thereto a two part supporting arm which is here shown as comprising a sleeve 39 and a rod 40 slidably mounted in the sleeve 39. The adjustable connection between the sleeve 39 and the clamp 38 is preferably formed about a horizontal axis and in the present instance the clamp and the sleeve are provided with serrated plates 41, the teeth of which interlock and which are held in interlocking engagement by a bolt 42 and thumb nut 43. This adjustment permits the supporting arm to be placed in a horizontal position regardless of the position of the part to which it is attached. The rod 40, which is held in adjusted positions within the sleeve 39 by means of a set screw 44, is adjustably connected to the casing 1 of a signal on a substantially vertical axis and for this purpose the outer end of the rod is provided with a serrated plate 45, the teeth of which interlock with a similar plate 46 secured to the bottom of the casing 1 of the signal and held in engagement therewith by a nut 47 on a bolt 48. By means of these adjustments the signal can be placed within convenient reach of the operator and in such a position that the signals will be properly displayed.

If desired, the signal may be used as a support for a mirror, such as is commonly used to enable the driver to see the road in the rear of his machine and we have shown the casing 1 as having such a mirror mounted on one side thereof, at 49. In order that the mirror may be adjusted to the proper angle it is pivotally connected to the casing at one edge and has a screw 50 extending through the same and mounted in a socket in the side wall of the casing 1, as shown at 51. This connection is such as to permit the screw to rotate but to hold it against axial movement, thus causing the edge of the mirror through which the screw extends to move along the screw when the latter is rotated.

While we have shown and described one embodiment of the invention it will be understood that this has been chosen for the purposes of illustration only and that we do not desire to be limited to the details of construction shown and described, for obvious modifications will occur to a person skilled in the art.

Having thus fully described our invention, what we claim as new and desire to secure by Letters Patent, is:—

1. In a signaling device, the combination with a frame and a plurality of visual signals pivotally mounted on said frame and separately movable into and out of signaling position, of a plurality of operating members mounted on said frame for both sliding and pivotal movement and operatively connected with the respective signals, and a plurality of actuating devices mounted on said frame and arranged in operative relation to the respective operating members, each of said actuating devices having a part extending beyond said frame to enable operative movement to be imparted thereto.

2. In a signaling device, the combination with a frame and a plurality of visual signals pivotally mounted on said frame and separately movable into and out of signaling position, and crank arms connected with the respective signals, of a plurality of operating members mounted on said frame for both sliding and pivotal movement and pivotally connected with the respective crank arms, and a plurality of actuating devices mounted on said frame and arranged in operative relation to the respective operating members, each of said actuating devices having a part extending beyond said frame to enable operative movement to be imparted thereto.

3. In a signaling device, the combination, with a frame, and a plurality of visual signals pivotally mounted on said frame and separately movable into and out of signaling position, of operating mechanism comprising a plurality of slidable members arranged in operative relation to the respective signals and separately operable to cause a selected signal to be moved into signaling position, a detent for each of said signals to retain the same in its inoperative position, a plurality of thrust rods each having a part arranged to engage and actuate the corresponding slidable operating member and a part connected with each of said thrust rods to move the corresponding detent into its inoperative position.

4. In a signaling device, the combination, with a frame, and a plurality of visual signals pivotally mounted on said frame and separately movable into and out of signaling position, of operating mechanism comprising a plurality of slidable members arranged in operative relation to the respective signals and separately operable to cause a selected signal to be moved into signaling position, a detent for each of said signals to retain the same in its inoperative position, a plurality of thrust rods each slidably mounted in alinement with one of said slidable operating members, a second rod connected with each of said thrust rods and arranged to actuate the corresponding detent, and springs to hold said thrust rods normally in their outermost positions.

5. In a signaling device, the combination, with a frame, a plurality of visual signals pivotally mounted on said frame and capable of separate movement, and a crank arm connected with each of said signals, of a slide bar pivotally connected to each of said crank arms, means for guiding said slide bar and permitting the same to have pivotal movement as said crank arm moves about its axis, and a thrust rod mounted in alinement with each of said slide bars for separately actuating the same.

6. In a signaling device, the combination, with a frame, and a plurality of visual signals pivotally mounted on said frame and separately movable into and out of signaling position, of a plurality of operating members arranged in operative relation to the respective signals and separately operable to cause a selected signal to be moved into signaling position, a locking device for each signal, each locking device comprising a yieldable dog, a separate actuating device for each of said operating members, and a part connected with each of said actuating devices and arranged to engage the dog of the respective locking device to move the latter into its inoperative position and to ride over said yieldable dog on the return movement of said actuating device.

7. In a signaling device, the combination, with a frame, and a plurality of visual signals pivotally mounted on said frame and separately movable into and out of signaling position, of a plurality of operating members arranged in operative relation to the respective signals and separately operable to cause a selected signal to be moved into signaling position, each of said signals having a stop, separate pawls arranged to engage the stops of the respective signals, a dog pivotally mounted upon each of said pawls, a thrust rod arranged to actuate each of said operating members, a supplemental rod connected with said thrust rod and having a nose arranged to engage the dog of said pawl and actuate the latter when said thrust rod is moved in one direction and to ride over said dog when the thrust rod is moved in the opposite direction.

8. In a signaling device, the combination, with a frame, and a plurality of visual signals pivotally mounted on said frame and separately movable into and out of signaling position, each of said signals having a stop, of a plurality of dogs arranged to engage the stops of the respective signals to support the latter in their signaling positions, each dog having a cam shaped lower portion arranged to be engaged by said stop as the corresponding signal is moved to its signaling position, and operative connections between the several dogs, whereby the upward movement of any signal will cause the release of any other signal which is in signaling position.

9. In a signaling device, the combination, with a frame, and a plurality of visual signals pivotally mounted on said frame and separately movable into and out of signaling position, each of said signals having an elongated stop extending in the line of travel of the signal, of a plurality of pivoted dogs connected one with the other and arranged to engage the lower edge of the elongated slots of the respective signals to support the latter in their signaling positions and each having a cam shaped lower portion arranged to be engaged by the upper portion of the stop as the signal moves toward its signaling position, whereby the first portion of the movement of one signal toward signaling position will release any other signal that may be in signaling position and will hold the dogs in their inoperative position until the first-mentioned signal has been moved into its signaling position.

10. In a signaling device, the combination with a frame, a plurality of visual signals pivotally mounted on said frame and separately movable into and out of signaling position, and a locking device for each signal, each locking device comprising a yieldable dog, of a plurality of actuating devices mounted on said frame and separately operable, operative connections between said actuating devices and the respective signals, and a part connected with each of said actuating devices and arranged to engage the dog of the corresponding locking device to move the latter into its inoperative position and to ride over said yieldable dog on the return movement of said actuating device.

11. In a signaling device, a frame, a plurality of visual signals mounted on said frame and separately movable into and out of signaling position, means for locking said signals either out of signaling position or in signaling position, manually operated actuated means mounted on said frame to move a selected signal into signaling position, means controlled by said actuating means to release the selected signal from the locking means which holds it out of signaling position, and means to actuate the locking means which retain said signals in signaling positions to release any signal which may be in signaling position as the selected signal moves toward signaling position, whereby the manipulation of said actuating device will cause the selected signal only to occupy its signaling position.

In testimony whereof, we affix our signatures in presence of two witnesses.

LORETTA K. GOTTSCHALL.
JOHN B. AUFULDISH.

Witnesses:
R. LEE AMES,
DANIEL BLAU.